US012611938B2

(12) United States Patent
Stolth

(10) Patent No.: US 12,611,938 B2
(45) Date of Patent: Apr. 28, 2026

(54) METHOD FOR PROPELLING AND MANUFACTURING OF A VEHICLE COMPRISING A POWER TRAIN WITH AN ELECTRIC MOTOR AND A VEHICLE COMPRISING A POWER TRAIN WITH AN ELECTRIC MOTOR

(71) Applicant: Scania CV AB, Södertälje (SE)

(72) Inventor: Johannes Stolth, Farsta (SE)

(73) Assignee: Scania CV AB, Södertälje (SE)

( * ) Notice: Subject to any disclaimer, the term of this patent is extended or adjusted under 35 U.S.C. 154(b) by 791 days.

(21) Appl. No.: 17/791,969

(22) PCT Filed: Feb. 3, 2021

(86) PCT No.: PCT/SE2021/050077
§ 371 (c)(1),
(2) Date: Jul. 11, 2022

(87) PCT Pub. No.: WO2021/158161
PCT Pub. Date: Aug. 12, 2021

(65) Prior Publication Data
US 2023/0051593 A1 Feb. 16, 2023

(30) Foreign Application Priority Data

Feb. 6, 2020 (SE) .................................... 2050121-9

(51) Int. Cl.
*B60L 9/00* (2019.01)
*B60L 50/53* (2019.01)
*B62D 65/18* (2006.01)
(52) U.S. Cl.
CPC .................. *B60L 9/00* (2013.01); *B60L 50/53* (2019.02); *B62D 65/18* (2013.01)
(58) Field of Classification Search
CPC ............ B60L 9/00; B60L 50/53; B62D 65/18
See application file for complete search history.

(56) References Cited

U.S. PATENT DOCUMENTS

| | | | | |
|---|---|---|---|---|
| 9,592,742 | B1 * | 3/2017 | Sosinov | .................. B60L 53/68 |
| 9,731,609 | B2 * | 8/2017 | Ambrosio | .............. B60L 50/11 |

(Continued)

FOREIGN PATENT DOCUMENTS

| | | | | |
|---|---|---|---|---|
| CN | 103003105 B | * | 3/2016 | .............. B60L 50/20 |
| CN | 107054365 A | | 8/2017 | |

(Continued)

OTHER PUBLICATIONS

Scania CV AB, International Patent Application No. PCT/SE2021/050077, International Search Report, Mar. 16, 2021.

(Continued)

*Primary Examiner* — Jason C Smith
(74) *Attorney, Agent, or Firm* — Moore & Van Allen PLLC; W. Kevin Ransom

(57) ABSTRACT

A method for propelling of a vehicle comprising a power train with an electric motor connected to a location in the vehicle intended for mounting of an energy supply unit intended for driving of the electric motor during normal operating conditions of the vehicle is described. The method comprises the steps of: connecting an electric power source to a power connection element mounted on the vehicle and being connected to the electric motor and to the location, disconnecting the location in order to accomplish a direct connection between the power connection element and the electric motor and propelling the vehicle by means of the electric motor powered by electricity from the electric power source. A method for manufacturing of a vehicle comprising a power train with an electric motor and a vehicle comprising a power train with an electric motor are also described herein.

13 Claims, 2 Drawing Sheets

(56) References Cited

U.S. PATENT DOCUMENTS

| | | | | |
|---|---|---|---|---|
| 9,751,421 | B2 * | 9/2017 | Kinomura | B60L 58/12 |
| 10,053,096 | B2 | 8/2018 | Schunk et al. | |
| 10,703,209 | B2 | 7/2020 | Yamamoto et al. | |
| 10,913,357 | B2 | 2/2021 | Gustafsson | |
| 2005/0039630 | A1 * | 2/2005 | Kumar | B60K 6/46 |
| | | | | 105/35 |
| 2012/0013179 | A1 | 1/2012 | Muto et al. | |
| 2013/0162032 | A1 * | 6/2013 | Matt | B60L 50/12 |
| | | | | 307/10.1 |
| 2014/0012446 | A1 | 1/2014 | Kumar et al. | |
| 2014/0088804 | A1 | 3/2014 | Hyde et al. | |
| 2015/0061377 | A1 * | 3/2015 | Ishikawa | B61C 17/06 |
| | | | | 307/9.1 |
| 2018/0229618 | A1 * | 8/2018 | Lee | B60L 50/13 |
| 2018/0290561 | A1 | 10/2018 | Baumgrtner | |
| 2019/0123578 | A1 | 4/2019 | Zenner et al. | |
| 2019/0165591 | A1 * | 5/2019 | Kisacikoglu | B60L 53/20 |
| 2023/0051593 | A1 * | 2/2023 | Stolth | B60L 9/00 |

FOREIGN PATENT DOCUMENTS

| | | | | |
|---|---|---|---|---|
| CN | 108233467 | A | 6/2018 | |
| CN | 108473057 | A | 8/2018 | |
| DE | 102016001495 | A1 | 8/2017 | |
| DE | 102017222397 | A1 | 6/2019 | |
| EP | 2570292 | A1 * | 3/2013 | B60L 1/00 |
| EP | 2738034 | A1 * | 6/2014 | B60L 1/003 |
| KR | 20200065572 | A * | 6/2020 | |
| KR | 20210067022 | A * | 6/2021 | |
| RU | 2553617 | C2 * | 6/2015 | B60L 53/20 |
| WO | WO-0104984 | A1 * | 1/2001 | B60L 1/003 |
| WO | WO-2011099193 | A1 * | 8/2011 | B60L 7/16 |
| WO | 2014180489 | A1 | 11/2014 | |

OTHER PUBLICATIONS

Scania CV AB, International Patent Application No. PCT/SE2021/050077, Written Opinion, Mar. 16, 2021.
Scania CV AB, Swedish Patent Application No. 2050121-9, Office Action, Sep. 9, 2020.
Scania CV AB, European Patent Application No. 21750387.9, Extended European Search Report, Feb. 20, 2024.
Scania CV AB, International Patent Application No. PCT/SE2021/050077, International Preliminary Report on Patentability, Jul. 28, 2022.
Scania CV AB, Chinese Patent Application No. 202180007233.2, Second Office Action, May 28, 2025.
Scania CV AB, Chinese Patent Application No. 202180007233.2, Office Action, Feb. 14, 2025.
Scania CV AB, Chinese Patent Application No. 202180007233.2, Third Office Action, Aug. 13, 2025.
Scania CV AB, Chinese Patent Application No. 202180007233.2, Decision of Rejection, Jan. 5, 2026.

* cited by examiner

18

4

2

METHOD FOR PROPELLING AND MANUFACTURING OF A VEHICLE COMPRISING A POWER TRAIN WITH AN ELECTRIC MOTOR AND A VEHICLE COMPRISING A POWER TRAIN WITH AN ELECTRIC MOTOR

CROSS-REFERENCE TO RELATED APPLICATIONS

This application is a National Stage Patent Application (filed under 35 § U.S.C. 371) of PCT/SE2021/050077, filed Feb. 3, 2021, of the same title, which, in turn claims priority to Swedish Patent Application No. 2050121-9 filed Feb. 6, 2020, of the same title; the contents of each of which are hereby incorporated by reference.

FIELD OF THE INVENTION

The present disclosure relates to a method for propelling of an electric vehicle. The present disclosure also relates to a method for manufacturing of an electric vehicle and to an electric vehicle.

BACKGROUND OF THE INVENTION

Electric vehicles are expected to increase in demand in the coming years and thereby change the modern transportation system. Progress within technologies related to batteries has recently had an important impact on the development of electric vehicles.

In some situations, for example when one or several batteries in a battery pack is depleted or broken, an external source of electric energy may be required to enable propulsion of an electric vehicle.

Efforts have been made to develop techniques of transferring electricity to an electric vehicle in order to support the propulsion of the vehicle.

US 2018/0290561 A1 describes a use of a range extender vehicle having a range extender energy storage arranged for supplying a main vehicle with electricity.

Although the technologies described in the cited document works well, it is desirable to provide an improved method for propelling of an electric vehicle enabling propelling of the vehicle in a simple and efficient manner when electricity from a battery pack of the vehicle is not available or is not sufficient. Further, it is desirable to provide an improved method for manufacturing of an electric vehicle, which method enables moving of the vehicle during manufacturing of the vehicle in a simple and efficient manner when electricity from a battery pack of the vehicle is not available or is not sufficient. Yet further, it is desirable to provide an improved electric vehicle.

SUMMARY OF THE INVENTION

An object of the present disclosure is to provide an improved method for propelling of a vehicle comprising a power train with an electric motor, especially in situations when electricity from an energy supply unit intended for propelling of the vehicle, for example a battery pack, is not available or is not sufficient. Further, an object of present disclosure is to provide an improved method for manufacturing of a vehicle comprising a power train with an electric motor concerning, inter alia, the possibility of propelling of the vehicle during manufacturing of the vehicle, by means of the electric motor, before an energy supply unit intended for propelling of the vehicle has been assembled in the vehicle. Yet further, an object of the present disclosure is to provide an improved vehicle comprising a power train with an electric motor.

The object is achieved by a method for propelling of a vehicle comprising a power train with an electric motor connected to a location in the vehicle intended for mounting of an energy supply unit intended for driving of the electric motor during normal operating conditions of the vehicle.

The location concerns a place in the vehicle arranged for mounting of the energy supply unit. Thus, the energy supply unit can also be called an internal energy supply unit. The energy supply unit is adapted for driving of the electric motor which is a part of the power train of the vehicle. Thus, the energy supply unit is adapted for propelling of the vehicle by means of the electric motor.

The method comprises the steps of: connecting an electric power source to a power connection element mounted on the vehicle and being connected to the electric motor and to the location, disconnecting the location in order to accomplish a direct connection between the power connection element and the electric motor and propelling the vehicle by means of the electric motor powered by electricity from the electric power source.

The electric power source is connected to the power connection element mounted on the vehicle. Thus, the electric power source is arranged outside of the vehicle. Because the electric power source is arranged outside of the vehicle, i.e. not arranged in the vehicle, the electric power source may also be called an external electric power source with respect to the vehicle.

The power connection element, such as an electrical power inlet is mounted on the vehicle. The power connection element may be fastened in a rigid manner to a part of the vehicle, such as a body of the vehicle or a frame of a chassis of the vehicle. Thus, the electric power source can be connected to the power connection element and thereby to the vehicle in a simple and a safe manner.

Because the power connection element is connected to the electric motor and to the location, electricity from the electric power source can be supplied to the electric motor and to the location through the power connection element.

By disconnecting the location, the electricity from the electric power source will not be supplied to the location but will be directly supplied to the electric motor. Thus, the electric motor can be driven by electricity directly from the electric power source. Accordingly, the vehicle can be propelled by means of the electric motor powered by electricity supplied directly from the electric power source connected to the power connection element. Thus, the vehicle can be propelled when electricity from an energy supply unit intended for propelling of the vehicle, for example a battery pack, is not available or is not sufficient. Consequently, an improved method for propelling of a vehicle comprising a power train with an electric motor is provided. Thereby, the above mentioned object is achieved.

According to an embodiment the vehicle comprises a switch device connected to the power connection element, to the location and to the electric motor, wherein the disconnection of the location is accomplished by disconnecting a connection between the switch device and the location, by means of the switch device.

The connection is arranged to connect the switch device and the energy supply unit intended to be mounted in the location and intended for propelling of the vehicle. The switch device is arranged to enable disconnecting the connection. Further, the switch device is arranged to enable reconnecting of the connection. Thus, thanks to the switch device the connection can be disconnected in a simple and reliable manner, and can be reconnected after being disconnected when desired. The connection can be disconnected and reconnected in a repeatable manner by means of the switch device.

When disconnected, the connection to the location will not be conductive. Thus, risks for accidents, for example during a manufacturing process of the vehicle, when assembling is performed at the location may be reduced. Further, energy losses can be reduced when the connection to the location has been disconnected.

According to an embodiment the disconnection of the location is accomplished by means of a safety device arranged at the location or at the connection to the location. The safety device may be arranged at the energy supply unit intended to be mounted in the location. The safety device may also be arranged along the connection and for example in vicinity of the location. The safety device, for example an electric switch, is arranged to enable disconnection and reconnection of the connection in a repeatable manner. Thus, the location can be disconnected in a simple and reliable manner and be reconnected after being disconnected when desired.

According to an embodiment the disconnection is triggered by a detecting unit arranged at the power connection element and arranged to detect the connection of the electric power source with the power connection element. The detecting unit is arranged to detect, i.e. to sense when the electric power source has been connected to the power connection element. Thus, thanks to the detecting unit it is known when the electric power source has been connected to the power connection element. Further, the detecting unit is arranged to create a signal comprising an information about the fact that the electric power source has been connected to the power connection element. The signal can be sent directly to the switch device and/or to the safety device in order to activate the switch device and/or to activate the safety device for disconnecting the location. As an alternative, the signal may be sent to a control element arranged to control the switch device and/or the safety device to disconnect and reconnect the location. Thus, the location can be disconnected when it is known that the power source has been connected to the power connection element. Consequently, risks for an unnecessary disconnection of the location can be reduced.

According to an embodiment the electric power source is connected to the power connection element by means of an electric wire. The electric wire is adapted to be connected to the electric power source and to the power connection element. Thus, the electric power source can be connected to the power connection element in a simple and reliable manner by means of the electric wire.

According to an embodiment the method comprises controlling a safety unit arranged at the power connection element in order to enable propelling of the vehicle with the wire connected to the power connection element. The safety unit is arranged to have at least a function of warning a user when the wire has been connected to the power connection element. A further function of the safety unit may be to prevent propelling of the vehicle with the wire connected to the power connection element. The safety unit is controllable and thereby the function of preventing propelling of the vehicle with the wire connected to the power connection element can be deactivated to enable propelling of the vehicle with the wire connected to the power connection element. Propelling of the vehicle with the wire connected to the power connection element provides the advantage that the vehicle can be moved with the wire kept connected to the power connection element. Thus, the vehicle can be propelled and thereby moved in a simple manner by means of electricity from the electric power source delivered through the electric wire.

According to an embodiment the power connection element is a standard connection element for charging of the vehicle. The power connection element can be used both for propelling of the vehicle and for charging of the vehicle. Thus, there is no need of different connection elements for propelling of the vehicle and for charging of the vehicle. As one effect, the electric power source can be connected to the power connection element in a simple and efficient manner without need of any additional connection elements which would complicate the construction of the vehicle and increase the costs of the vehicle.

According to an embodiment the electric power source is formed by at least one of: power grid, a local power network or a mobile electric power source. Thus, the vehicle can be propelled by means of the electric motor that can be driven by electricity from different electric power sources.

The above mentioned object is achieved by a method for manufacturing of a vehicle comprising a power train with an electric motor connected to a location in the vehicle intended for mounting of an energy supply unit intended for driving of the electric motor during normal operating conditions of the vehicle, wherein the method comprises propelling the vehicle by applying a method for propelling of a vehicle comprising a power train with an electric motor according to any of the above described embodiments.

Manufacturing lines for vehicles, such as trucks, are often built for conventional combustion engines. Assembling of electrical components, for example battery packs, require special routines and environments adapted for handling of high voltage elements. The requirements are set due to, inter alia, safety reasons. The manufacturing lines for combustion engines may not be suitable for assembling of electrical components such as battery packs.

One advantage of the method for propelling of a vehicle comprising a power train with an electric motor according to the above described embodiments is that the vehicle can be propelled in a simple manner by means of the electric motor driven directly by electricity from an electric power source, such as, for example the power grid.

Consequently, the vehicle can be moved without need of for example a battery pack being mounted in the vehicle which implies that at least a part of an existing manufacturing line for conventional combustion engines can be used for manufacturing of electric vehicles. Thus, manufacturing costs of electric vehicles can be reduced.

Further, it is advantageous to assemble the energy supply unit as late as possible during a manufacturing process of an electric vehicle. Thus, thanks to the method for propelling of a vehicle comprising a power train with an electric motor the energy supply unit can be mounted in the vehicle at the end of the manufacturing process or at the location for delivery of the vehicle.

Accordingly, an improved method for manufacturing of a vehicle comprising a power train with an electric motor is provided and thereby, the above mentioned object is achieved.

According to an embodiment of the method for manufacturing of a vehicle, the propelling of the vehicle is performed before assembling of the energy supply unit in the vehicle.

Thus, the vehicle can be moved in a simple manner before the energy supply unit has been mounted in the location in the vehicle.

According to an embodiment of the method for manufacturing of a vehicle, the method comprises assembling of the energy supply unit in the vehicle at a station separated from a manufacturing line of the vehicle where at least the power train with the electric motor, and the location intended for mounting of the energy supply unit has been assembled.

With assembling of the energy supply unit in the vehicle is herein meant to mount the energy supply unit in the location in the vehicle.

Assembling of electrical components, for example battery packs require special safety routines and an environment adapted for handling of high voltage elements. Handling of high voltage elements require a clean environment adapted for, inter alia, a potential fire of the high voltage elements.

The station separated from a manufacturing line of the vehicle has an advantage of reducing risks for damages caused by a fire or other accidents in the station. Further, creating of a clean and safe environment for assembling of the energy supply unit can be facilitated when the station is separated from the manufacturing line of the vehicle. The station can be arranged in the same building as the manufacturing line but being separated from the manufacturing line by means of, for example, separation walls. Alternatively, the station can be arranged in a separated building to the building with the manufacturing line. Consequently, existing manufacturing lines can still be used for manufacturing of electric vehicles. As a result, a yet improved method for manufacturing of a vehicle comprising a power train with an electric motor is provided.

According to an embodiment of the method for manufacturing of a vehicle the energy supply unit is formed by a battery pack and/or a fuel cell device.

The above mentioned object is also achieved by a vehicle comprising a power train with an electric motor connected to a location in the vehicle intended for mounting of an energy supply unit intended for driving of the electric motor during normal operating conditions of the vehicle, wherein the vehicle has been manufactured by using a method for manufacturing of a vehicle according to any embodiments as above.

The above mentioned object is also achieved by a vehicle comprising a power train with an electric motor connected to a location in the vehicle intended for mounting of an energy supply unit intended for driving of the electric motor during normal operating conditions of the vehicle, wherein the vehicle comprises a power connection element arranged for connecting of an electric power source to the vehicle, wherein the power connection element is connected to the electric motor and to the location, a disconnecting device connected to the power connection element, to the electric motor and to the location and arranged to disconnect the location in order to accomplish a direct connection between the power connection element and the electric motor to enable propelling of the vehicle by means of the electric motor powered by electricity from the electric power source.

The power connection element, such as an electrical power inlet is mounted on the vehicle. The power connection element may be fastened in a rigid manner to a part of the vehicle, such as a body of the vehicle or a frame of a chassis of the vehicle. Thus, the electric power source can be connected to the power connection element and thereby to the vehicle in a simple and a safe manner.

Because the power connection element is connected to the electric motor and to the location, electricity from the electric power source can be supplied to the electric motor and to the location through the power connection element.

By disconnecting the location the electricity from the electric power source will not be supplied to the location but will be directly supplied to the electric motor. Thus, the electric motor can be driven by electricity directly from the electric power source. Accordingly, the vehicle can be propelled by means of the electric motor powered by electricity supplied directly from the electric power source connected to the power connection element. Thus, the vehicle can be propelled when electricity from an energy supply unit intended for propelling of the vehicle, for example a battery pack, is not available or is not sufficient. Consequently, an improved vehicle comprising a power train with an electric motor is provided and thereby, the above mentioned object is achieved.

According to an embodiment the disconnecting device comprises a switch device, wherein the disconnection of the location is accomplished by disconnecting a connection between the switch device and the location, by means of the switch device. The connection is arranged to connect the switch device with the energy supply unit intended to be mounted in the location and intended for propelling of the vehicle. The switch device is arranged to enable disconnecting the connection. Further, the switch device is arranged to enable reconnecting of the connection. Thus, thanks to the switch device the connection can be disconnected in a simple and reliable manner, and can be reconnected after being disconnected when desired. The connection can be disconnected and reconnected in a repeatable manner by means of the switch device.

When disconnected, the connection to the location will not be conductive. Thus, risks for accidents, for example during a manufacturing process of the vehicle, when assembling is performed at the location, may be reduced. Further, energy losses can be reduced when the connection to the location has been disconnected.

According to an embodiment the disconnecting device comprises a safety device arranged at the location or at the connection to the location. The safety device may be arranged at the energy supply unit intended to be mounted in the location. The safety device may also be arranged along the connection and for example in vicinity of the location. The safety device, for example an electric switch, is arranged to enable disconnection and reconnection of the connection in a repeatable manner. Thus, the location can be disconnected in a simple and reliable manner and be reconnected after being disconnected when desired.

According to an embodiment the vehicle comprises a detecting unit arranged at the power connection element and connected to the disconnecting device, wherein the detecting unit is arranged to detect the connection of the electric power source with the power connection element and to trigger the disconnecting device to disconnect the location. The detecting unit is arranged to detect, i.e. to sense, when the electric power source has been connected to the power connection element. Thus, thanks to the detecting unit it is known when the electric power source has been connected to the power connection element. Further, the detecting unit is arranged to create a signal comprising information about the fact that the electric power source has been connected to the power connection element. The signal can be sent directly to the switch device and/or to the safety device in order to activate the switch device and/or to activate the safety device for disconnecting the location. As an alternative, the signal may be sent to a control element arranged to control the switch device and/or the safety device to disconnect and reconnect the location. Thus, the location can be disconnected when it is known that the power source has been connected to the power connection element. Consequently, risks for an unnecessary disconnection of the location can be reduced.

According to an embodiment the vehicle comprises a safety unit arranged at the power connection element and arranged to enable propelling of the vehicle by means of the electric motor powered by electricity from the electric power source supplied to the electric motor through a wire connected to the power connection element. The safety unit is arranged such that the safety unit has at least a function of warning a user when the wire has been connected to the power connection element. A further function of the safety unit may be to prevent propelling of the vehicle with the wire connected to the power connection element. The safety unit is controllable and thereby the function of preventing propelling of the vehicle with the wire connected to the power connection element can be deactivated to enable propelling of the vehicle with the wire connected to the power connection element. Propelling of the vehicle with the wire connected to the power connection element has an advantage that the vehicle can be moved with the wire kept connected to the power connection element. Thus, the vehicle can be propelled and thereby moved in a simple manner by means of electricity from the electric power source delivered through the electric wire.

According to an embodiment the power connection element is a standard connection element for charging of the vehicle. The power connection element can be used both for propelling of the vehicle and for charging of the vehicle. Thus, there is no need for different connection elements for propelling of the vehicle and for charging of the vehicle. As an effect, the electric power source can be connected to the power connection element in a simple and efficient manner without need of any additional connection elements which would complicate the construction of the vehicle and increase the costs of the vehicle.

Further advantages as well as advantageous features of the disclosure will appear from the description following below.

BRIEF DESCRIPTION OF THE DRAWINGS

In the following preferred embodiments of the invention are described with reference to the attached drawings, on which.

DETAILED DESCRIPTION OF PREFERRED EMBODIMENTS OF THE INVENTION

Figure 1:
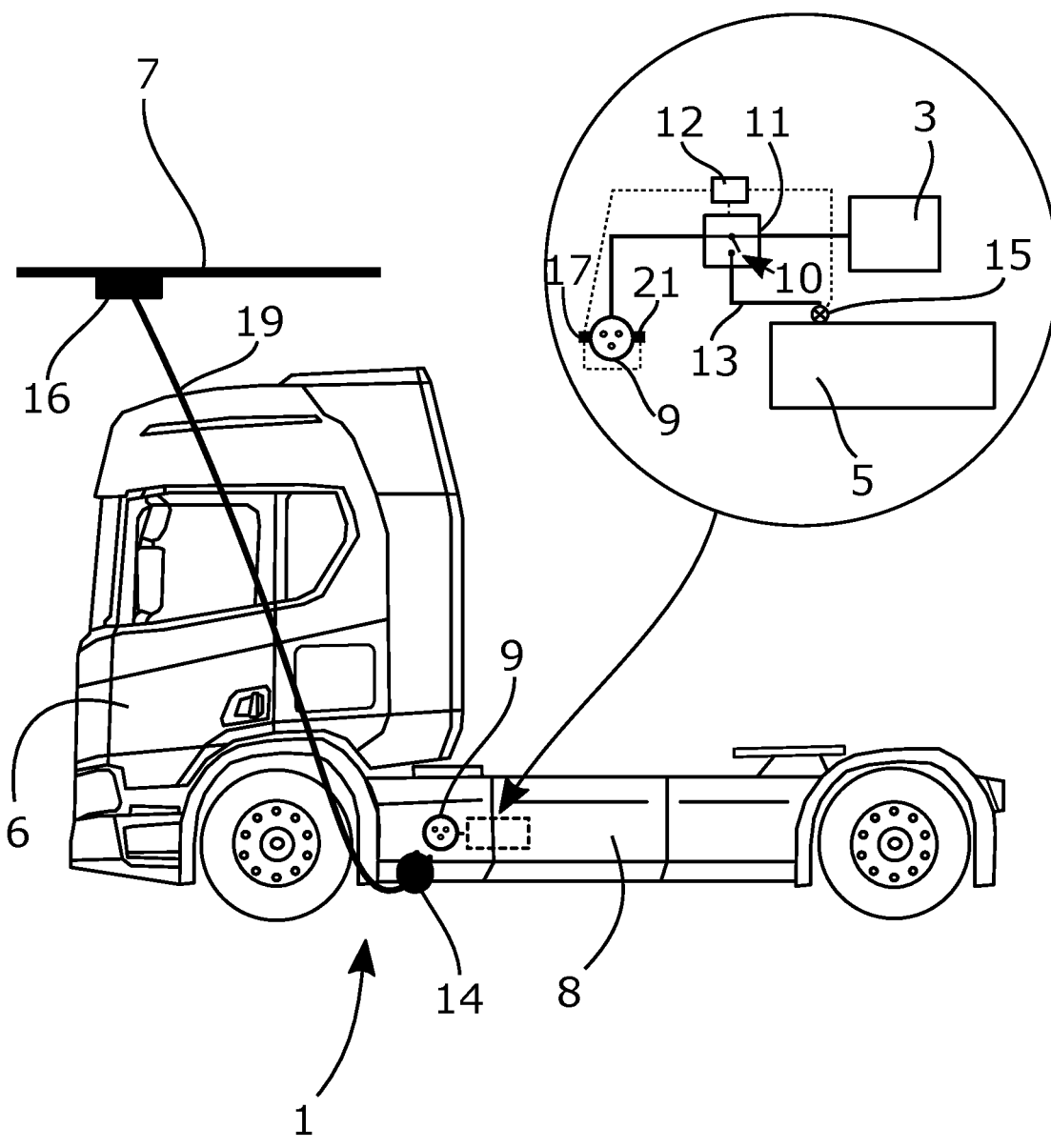
FIG. 1. is a perspective view of a vehicle comprising a power train with an electric motor.

FIG. 1 shows a vehicle 1 comprising a power train with an electric motor 3. The vehicle 1 may be a truck, a bus or any other kind of vehicle. It is common knowledge that a power train of a vehicle comprises components that transmit power from the engine to the wheels of the vehicle. Therefore, the power train comprising the electric motor 3 is not illustrated in detail herein.

The electric motor 3 is connected to a location 5 in the vehicle 1 intended for mounting of an energy supply unit intended for driving of the electric motor 3 during normal operating conditions of the vehicle 1. The location 5 concerns a place in the vehicle 1 arranged for mounting of the energy supply unit. The location 5 may be a container or a holder arranged in the vehicle 1. The location 5 is adapted to receive the energy supply unit. The energy supply unit may be fastened in the location 5. The energy supply unit is not illustrated in FIG. 1. The energy supply unit may e.g. be formed by a battery pack and/or a fuel cell device. The energy supply unit, when mounted in the vehicle 1, is adapted for driving of the electric motor 3, i.e. for supplying the electric motor 3 with electric energy. Thus, the energy supply unit is adapted for propelling of the vehicle 1 by means of the electric motor 3 that is a part of the power train of the vehicle 1.

The vehicle 1 comprises a power connection element 9 arranged for connecting of an electric power source 7 to the vehicle 1.

The power connection element 9 may be fastened in a rigid manner to a part of the vehicle 1, such as e.g. a body 6 of the vehicle 1 or a frame of a chassis 8 of the vehicle 1. According to the embodiments illustrated in FIG. 1, the power connection element 9 is fastened to the chassis 8 of the vehicle 1. Thus, the electric power source 7 can be connected to the power connection element 9 in a simple and a safe manner.

The power connection element 9 may be a standard connection element for charging of the vehicle 1. The power connection element 9 may be a part of a combined charging system (CCS) arranged for charging of the vehicle 1, and particularly for charging of the energy supply unit when the energy supply unit has been mounted in the location 5 of the vehicle 1. The power connection element 9 can be used both for propelling of the vehicle 1 and for charging of the vehicle 1. Thus, no additional connection elements for charging of the vehicle 1, which would complicate the construction of the vehicle 1 and increase the costs, are needed.

The electric power source 7 can be formed by at least one of: a power grid, a local power network, a mobile electric power source or similar. In FIG. 1 the electric power source 7 is schematically illustrated as electric wiring extending above the vehicle 1. The electric wiring may be arranged along a ceiling of a building (not shown) with a manufacturing line for the vehicle 1. The electric wiring may alternatively be arranged in the floor of the building or at any other suitable positions. The electric wiring can be connected to power grid. Thus, electricity from the power grid can be supplied to the electric wiring and further to the vehicle 1.

The power connection element 9 is connected to the electric motor 3 and to the location 5. Because the power connection element 9 is arranged for connecting of the electric power source 7 to the vehicle 1, electricity from the electric power source 7 can be supplied to the electric motor 3 and to the location 5 through the power connection element 9.

The vehicle 1 comprises a disconnecting device 11, 15 connected to the power connection element 9, to the electric motor 3 and to the location 5. The disconnecting device 11, 15 is arranged to disconnect the location 5 in order to accomplish a direct connection between the power connection element 9 and the electric motor 3 to enable propelling of the vehicle 1 by means of the electric motor 3 powered by electricity from the electric power source 7.

The disconnecting device 11, 15 may comprise a switch device 11. Thus, the disconnection of the location 5 may be accomplished by disconnecting a connection 13 between the switch device 11 and the location 5, by means of the switch device 11. As illustrated in FIG. 1, the switch device 11 is connected to the electric motor 3 and to the connection element 9. The switch device 11 is also connected to the location 5 through the connection 13, which connection 13 can be disconnected by means of a switch element 10 comprised in the switch device 11. Thus, the connection 13 may be connected and disconnected when needed by means of the switch device 11. The switch device 11 may e.g. be a mechanical power switch.

As an alternative, the disconnecting device 11, 15 comprises a safety device 15. The safety device 15 may be arranged at the location 5 or at the connection 13 to the location 5. The safety device 15 may be arranged along the connection 13 and for example in vicinity of the location 5. The safety device 15 may be arranged at an end portion of the connection 13 intended to be connected to an energy supply unit intended to be mounted in the location 5.

The safety device 15, for example an electric switch, is arranged to enable disconnection and reconnection of the location 5 in a repeatable manner, for example by disconnecting the connection 13, and thereby the location 5, when the safety device has been arranged along the connection 13. The safety device 15 may be automatically activated to disconnect the location 5 and may be automatically deactivated to again connect the location 5 depending on current in the connection or depending on temperature at the location 5. The safety device 15 may be an over-current protection device or an over-temperature protection device. Activation and deactivation of the safety device can also be done in a controllable manner by means of, for example, a control element (not shown). Thus, the location 5 can be disconnected in a simple and reliable manner by means of the safety device 15 and be reconnected after being disconnected when desired.

The safety device 15 may be arranged at the energy supply unit. Thus, the safety device 15 may be arranged on the energy supply unit or may be integrated with the energy supply unit. As mentioned above, the energy supply unit may be formed by a battery pack and/or a fuel cell. Thus, the safety device 15 may be arranged on the battery pack and/or on the fuel cell. Alternatively, the safety device 15 may be integrated with the battery pack and/or on the fuel cell. Thus, one or several safety devices can be used. Preferably, one safety device 15 is used when the energy supply unit is formed by either the battery pack or the fuel cell. One or several safety devices may be used when the energy supply unit is formed by the battery pack and the fuel cell. Then, at least one of the several safety devices is arranged at the battery pack and at least one of the several safety devices is arranged at the fuel cell.

The vehicle 1 may further comprise a detecting unit 17 arranged at the power connection element 9 and connected to the disconnecting device 13, 15, wherein the detecting unit 17 is arranged to detect the connection of the electric power source 7 with the power connection element 9 and to trigger the disconnecting device 11, 15 to disconnect the location 5. As an alternative the detecting unit 17 is connected to a control element (not shown), which control element is connected to the disconnecting device 13, 15 in order to control the disconnecting device 13, 15.

The detecting unit 17 is arranged to detect, i.e. to sense when the electric power source 7 has been connected to the power connection element 9. Thus, thanks to the detecting unit 17 it may be known when the electric power source 7 has been connected to the power connection element 9.

The detecting unit 17 may be a sensor arranged for sensing the connection of the power source to the connection element 9. The detecting unit 17 may be integrated in the power connection element 9 or may be attached to the power connection element 9.

Further, the detecting unit 17 is arranged to create a signal comprising an information about the fact that the electric power source 7 has been connected to the power connection element 9.

The signal from the detecting unit 17 can be sent to a control element 12 connected to the switch device 11 and/or to the safety device 15, which control element 12 is arranged to control the switch device 11 and/or the safety device 15. The signal may be sent by means of a signal wire or may be sent wireless. The control element 12 can activate the switch device 11 and/or to activate the safety device 15 for disconnecting the location 5. Thus, the location 5 can be disconnected when it is known that the power source 7 has been connected to the power connection element 9. Consequently, risks for unnecessary disconnections of the connection can be reduced.

As mentioned above, the power connection element 9 may be a standard connection element for charging of the vehicle 1. Thus, the power connection element 9 can be used both for propelling of the vehicle 1 and for charging of the vehicle 1. In situations when charging of the vehicle 1 is desired, the signal created by the detecting unit 17, comprising the information about the fact that the electric power source 7 has been connected to the power connection element 9, can be used to keep the location 5 connected to the connection element 9 to enable charging of the energy supply unit when the energy supply unit has been assembled in the vehicle 1. The propelling of the vehicle 1 or the charging of the vehicle 1 can be controlled by a user of the vehicle 1, which user may select propelling or charging of the vehicle at the control element 12. When charging has been chosen the control element 12 controls the switch device 11 and/or the safety device 15 to keep the location 5 connected.

The vehicle 1 may also comprise a safety unit 21 arranged at the power connection element 9. The safety unit 21 is arranged to prevent propelling of the vehicle 1 when the wire 19 is connected to the power connection element 9. Thus, the safety unit 21 prevents driving of the vehicle 1 with the wire 19 connected to the vehicle 1.

According to an embodiment the safety unit 21 is connected to the detecting unit 17. Thus, the safety unit 21 can receive information from the detecting unit 17 about when the electric power source 7 has been connected to the power connection element 9. The safety unit 21 may be integrated in the power connection element 9 or may be attached to the power connection element 9.

The safety unit 21 is arranged to have at least a function of warning a user when the wire 19 has been connected to the power connection element 9. The further function of the safety unit 21 is to prevent propelling of the vehicle 1 with the wire 19 connected to the power connection element 9. It can be done by connecting the safety unit 21 to the detecting unit 17 and further by connecting the safety unit 21 to a start system of the vehicle 1. The start system of the vehicle 1 is not illustrated in FIG. 1. Thus, the detecting unit 17 detects that the wire 19 has been connected to the power connection element 9 and sends a signal to the safety unit 21 about the connection of the wire 19 with the power connection element 9. The detecting unit 17 and the safety unit 21 may be connected by means of a wire to enable sending of signals between the detecting unit 17 and the safety unit 21 or the signals between the detecting unit 17 and the safety unit 21 may be sent in a wireless manner.

After receiving the signal about the connection of the wire 19 with the power connection element 9, the safety unit 21 may send a signal to a start system of the vehicle 1 in order to deactivate the start system and thereby to prevent propelling of the vehicle 1 with the wire 19 connected to the power connection element 9.

The safety unit 21 is arranged controllable by means of a control device (not shown) and thereby the function of preventing propelling of the vehicle 1 with the wire 19 connected to the power connection element 9 can be deactivated to enable propelling of the vehicle 1 with the wire 19 connected to the power connection element 9. Thus, the safety unit 21 can be controlled such that no signal will be sent to the start system of the vehicle 1 to deactivate the start system, in order to enable propelling of the vehicle 1 with the wire 19 connected to the power connection element 9. Thus, the vehicle 1 can be propelled and thereby moved with the wire 19 connected to the vehicle 1 through the power connection element 9.

The wire 19 is arranged to transfer electricity from the electric power source 7 to the vehicle 1 through the power connection element 9. The wire 19 comprises a wire connection element 14 having a form that corresponds to the form of the power connection element 9. Thus, the wire connection element 14 can be inserted into the power connection element 9 and thereby form a connection between the wire connection element 14 and the power connection element 9 for transfer of electricity to, inter alia, the electric motor 3. The detecting unit 17, as described above, is arranged to detect when the wire connection element 14 has been connected to the power connection element 9. The wire 19 may be an extensible wire, such as a spiral wire. Thus, the wire 19 can be extended when connected to the vehicle 1 through the power connection element 9 and when the vehicle 1 is moved.

According to an embodiment the wire 19 is connected to a power connection element 16 arranged for connecting of the wire to the power source 7. According to an embodiment the power connection element 16 is a movable power connection element arranged to move along the electric wiring of the electric power source 7. Thus, when the vehicle 1 need to be moved with the wire 19 connected to the power connection element 9, the wire 19 can move together with the vehicle 1 by means of the movable power connection element that will be moved, for example by sliding along the wiring of the electric power source 7.

When the electric power source 7 is formed by a mobile electric power source, the wire 19 can move together with the mobile electric power source and together with the vehicle 1.

The wire 19 may be arranged connectable to the electric power source 7 or may be fixed to the electric power source 7 at the opposite end of the wire 19 in relation to the end comprising the wire connection element 14.

The vehicle 1 can be propelled by applying a method for propelling of the vehicle 1, the method comprising the steps of: connecting the electric power source 7 to the power connection element 9 mounted on the vehicle 1 and being connected to the electric motor 3 and to the location 5, disconnecting the location 5 in order to accomplish a direct connection between the power connection element 9 and the electric motor 3 and propelling the vehicle 1 by means of the electric motor 3 powered by electricity from the electric power source 7.

Herein, some optional embodiments of the method for propelling of the vehicle 1, are mentioned.

The disconnection of the location 5 may be accomplished by disconnecting the connection 13 between the switch device 11 and the location 5 by means of the switch device 11.

Optionally, the disconnection of the location 5 is accomplished by means of the safety device 15 arranged at the location 5 or at the connection 13 to the location 5.

The disconnection can be triggered by the detecting unit 17 arranged at the power connection element 9 and arranged to detect the connection of the electric power source 7 with the power connection element 9.

Optionally, the method for propelling of the vehicle 1 comprises controlling the safety unit 21 arranged at the power connection element 9 in order to enable propelling of the vehicle 1 with the wire 19 connected to the power connection element 9.

The method for propelling of the vehicle 1 is controlled by means of a vehicle control unit arranged in the vehicle 1. The vehicle control unit is not described herein.

Figure 2:
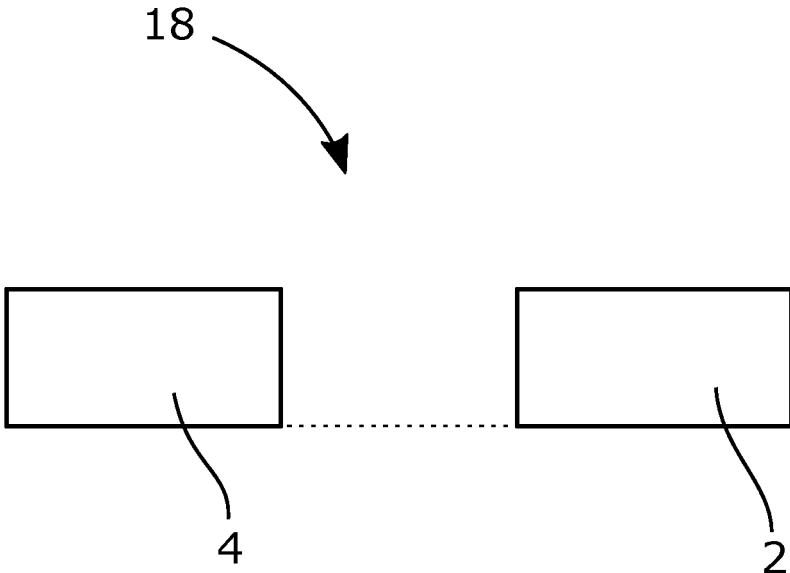
FIG. 2. is a schematic representation of a manufacturing process.

FIG. 2 shows, in a schematic manner, a manufacturing process 18 for manufacturing of a vehicle comprising a power train with an electric motor. The manufacturing process 18 can be used for manufacturing of the vehicle 1 illustrated in FIG. 1.

The manufacturing process 18 comprises a manufacturing line 4 and a station 2. At the manufacturing line 4 at least the power train with the electric motor of the vehicle, and a location intended for mounting of an energy supply unit can be assembled. The manufacturing line 4 can be an existing conventional manufacturing line adapted for manufacturing of vehicles with an internal combustion engine. The manufacturing line 4 is built in a conventional way and is common knowledge within manufacturing of vehicles and is therefore not described in details herein.

The station 2, which may be a separate building, is adapted for handling of high voltage elements. Handling of high voltage elements requires a clean and safe environment. Strict requirements considering, inter alia, fire protection and equipment for handling a potential fire of the high voltage elements need to be fulfilled at the station 2. For example, quick extinguishing of the fire and transportation of dangerous gases out from the station 2 need to be considered. Further, the floor of the station 2 may need to be prepared with an electrically insulating material.

As illustrated in FIG. 2, the station 2 of the manufacturing process 18 can be separated from the manufacturing line 4, which means that the station 2 can be arranged at a different place or a different building to the place or the building for the manufacturing line. The station 2 may also be arranged at the same place or in the same building as the manufacturing line but separated by means of a barrier such as, for example, a wall with a doorway enabling a transport of a vehicle between the manufacturing line 4 and the station 2.

The station 2 separated from the manufacturing line 4 of the vehicle 1 has an advantage of reducing risks of damages caused by a fire or other accidents in the station 2. Further, creation of a clean and safe environment for assembling of the energy supply unit can be facilitated when the station 2 is separated from the manufacturing line 4 of the vehicle 1.

Assembling of the energy supply unit in the vehicle 1 means mounting of the energy supply unit in the location 5 in the vehicle 1.

The station 2 may be arranged at the place of delivery of an electric vehicle. For example, when a newly produced electric vehicle need to be transported to a customer, sometimes abroad, then the station 2 can be arranged at the client place or at least in the country the vehicle will be transported to. Thus, the vehicle can be propelled and thereby moved during the transportation, for example on a ship or train, by applying the method for propelling of a vehicle comprising a power train with an electric motor as described above.

Thereby an energy supply unit intended for driving of electric motor can be mounted at the place of delivery of the vehicle, which is advantageous because the energy supply unit does not need to be transported in the vehicle, sometimes long distances, during transportation of the vehicle. Thus, the life time of the energy supply unit can be improved.

The vehicle can be propelled during at least a part of the manufacturing process 18 by applying the method for propelling of a vehicle comprising a power train with an electric motor as described in conjunction to the description of FIG. 1 above.

It will be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions, or groups thereof.

The invention claimed is:

1. A method for propelling a vehicle comprising a power train with an electric motor configured to be electrically connected to a location in said vehicle, wherein the location is configured for mounting of an energy supply unit and electrically connecting the energy supply unit to the electric motor to thereby supply electric power to drive said electric motor during normal operating conditions of the vehicle, wherein the method comprises the steps of:

connecting an external electric power source to a power connection element mounted on said vehicle, wherein said power connection element electrically connects said electric motor to said location, such that electricity from the external electric power source can be supplied to both the electric motor and to the location via the power connection element;

detecting, via a detecting unit connected to said power connection element, connection of the external electric power source to said power connection element;

wherein when (i) the energy supply unit is not electrically connected to the location and (ii) the external electric power source is detected as being connected to said power connection element, disconnecting said location electrically from said power connection element and the electric motor, so as to isolate the location electrically from the external electric power source and the electric motor; and propelling the vehicle by means of the electric motor powered by electricity from said external electric power source, while the energy supply unit is not electrically connected to the location in the vehicle and the location is not electrically connected to said power connection element and the electric motor.

2. The method according to claim 1, wherein the vehicle comprises a switch device connected to the power connection element, to the location and to the electric motor, wherein said disconnection of the location is accomplished by disconnecting a connection between the switch device and the location, by means of said switch device.

3. The method according to claim 1, wherein said disconnection of the location is accomplished by means of a safety device arranged at said location or at said connection to the location.

4. The method according to claim 1, wherein said external electric power source is connected to the power connection element by means of an electric wire.

5. The method according to claim 4, comprising:

controlling a safety unit arranged at said power connection element in order to enable propelling of said vehicle with said wire connected to said power connection element.

6. The method according to claim 1, wherein said power connection element is a standard connection element for charging of the vehicle.

7. A method for manufacturing of a vehicle comprising a power train with an electric motor configured to be electrically connected to a location in said vehicle, wherein the location is configured for mounting of an energy supply unit and electrically connecting the energy supply unit to the electric motor to thereby supply electric power to drive said electric motor during normal operating conditions of the vehicle, wherein the method comprises:

propelling the vehicle during said manufacturing of the vehicle by:

connecting an external electric power source to a power connection element mounted on said vehicle, wherein said power connection element electrically connects said electric motor to said location, such that electricity from the external electric power source can be supplied to both the electric motor and to the location via the power connection element;

detecting, via a detecting unit connected to said power connection element, connection of the external electric power source to said power connection element;

wherein when (i) the energy supply unit is not electrically connected to the location and (ii) the external electric power source is detected as being connected to said power connection element, disconnecting said location electrically from said power connection element and the electric motor, so as to isolate the location electrically from the external electric power source and the electric motor; and propelling the vehicle by means of the electric motor powered by electricity from said external electric power source, while the energy supply unit is not electrically connected to the location in the vehicle and the location is not electrically connected to said power connection element and the electric motor.

8. The method according to claim 7, wherein said propelling of the vehicle is performed before assembling of the energy supply unit in said vehicle.

9. The method according to claim 8, comprising:

assembling of said energy supply unit in said vehicle at a station separated from a manufacturing line of the vehicle where at least said power train with said electric motor, and said location intended for mounting of the energy supply unit has been assembled.

10. A vehicle comprising a power train with an electric motor configured to be electrically connected to a location in said vehicle, wherein the location is configured for mounting of an energy supply unit and electrically connecting the energy supply unit to the electric motor to thereby supply electric power to drive said electric motor during normal operating conditions of the vehicle, wherein the vehicle comprises:

a power connection element arranged for connecting an external electric power source to a power connection element mounted on said vehicle, wherein said power connection element electrically connects said electric motor to said location, such that electricity from the external electric power source can be supplied to both the electric motor and to the location via the power connection element;

a detecting unit connected to said power connection element and configured for detecting connection of the external electric power source with said power connection element; and a disconnecting device connected to said power connection element, to said electric motor, and to said location and arranged to, when (i) the energy supply unit is not electrically connected to the location and (ii) the external electric power source is detected as being connected to said power connection element, disconnect said location electrically from said power connection element and the electric motor in said vehicle intended for mounting of the energy supply unit, so as to isolate the location electrically from the external electric power source and the electric motor and in order to accomplish a direct connection between the power connection element and the electric motor to enable propelling of the vehicle by means of the electric motor powered by electricity from said external electric power source, while the energy supply unit is not electrically connected to the location in the vehicle and the location is not electrically connected to said power connection element and the electric motor.

11. The vehicle according to claim 10, wherein said disconnecting device comprises a switch device, wherein said disconnection of the location is accomplished by disconnecting a connection between the switch device and the location, by means of said switch device.

12. The vehicle according to claim 10, wherein said disconnecting device comprises a safety device arranged at said location or at said connection to the location.

13. The vehicle according to claim 10, comprising:

a safety unit arranged at said power connection element and arranged to enable propelling of said vehicle by means of the electric motor powered by electricity from said external electric power source supplied to said electric motor through a wire connected to said power connection element.

* * * * *